W. S. STEELE.
GRAIN SAVING ATTACHMENT FOR BINDERS.
APPLICATION FILED NOV. 8, 1917.
1,272,140.
Patented July 9, 1918.
2 SHEETS—SHEET 1.
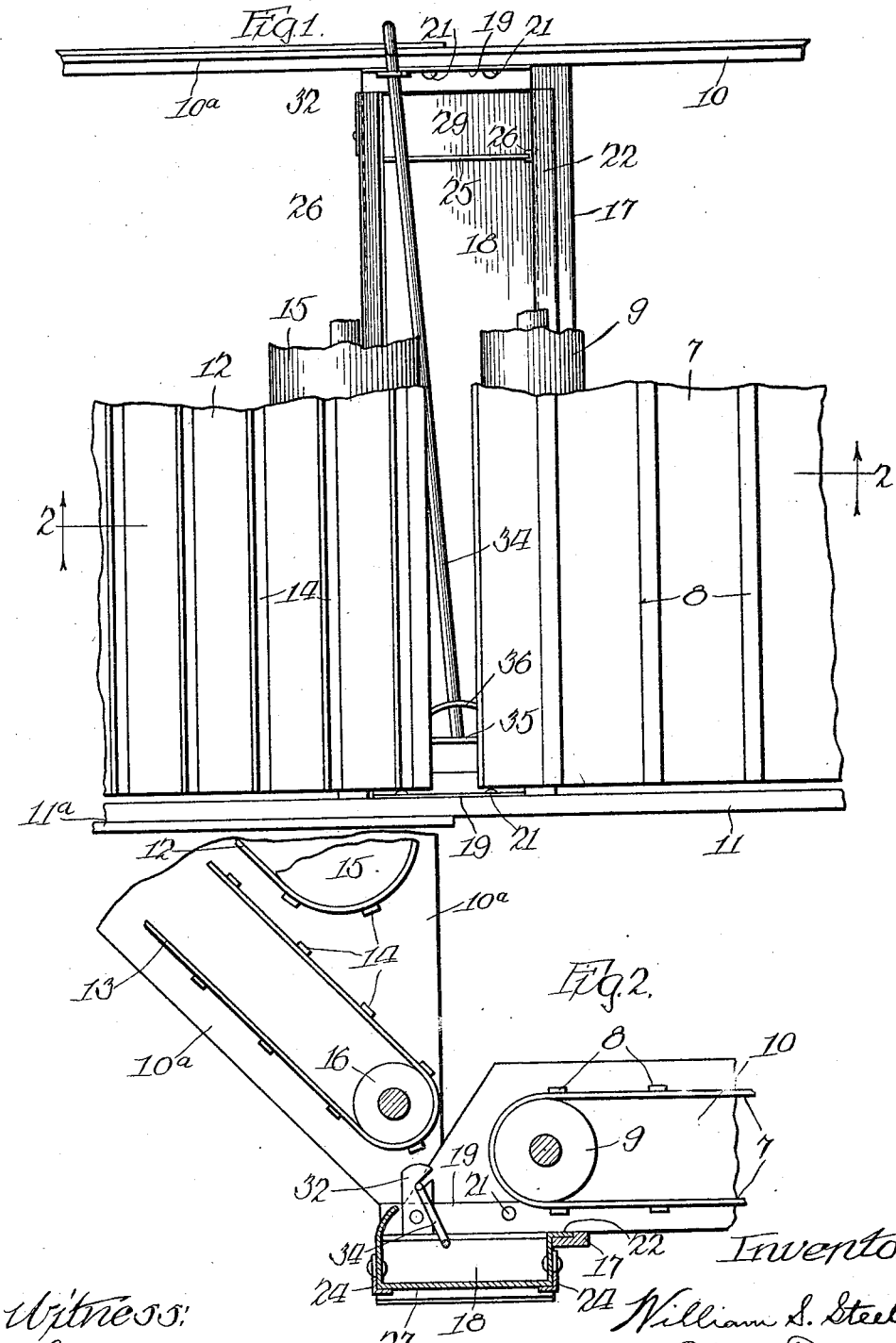

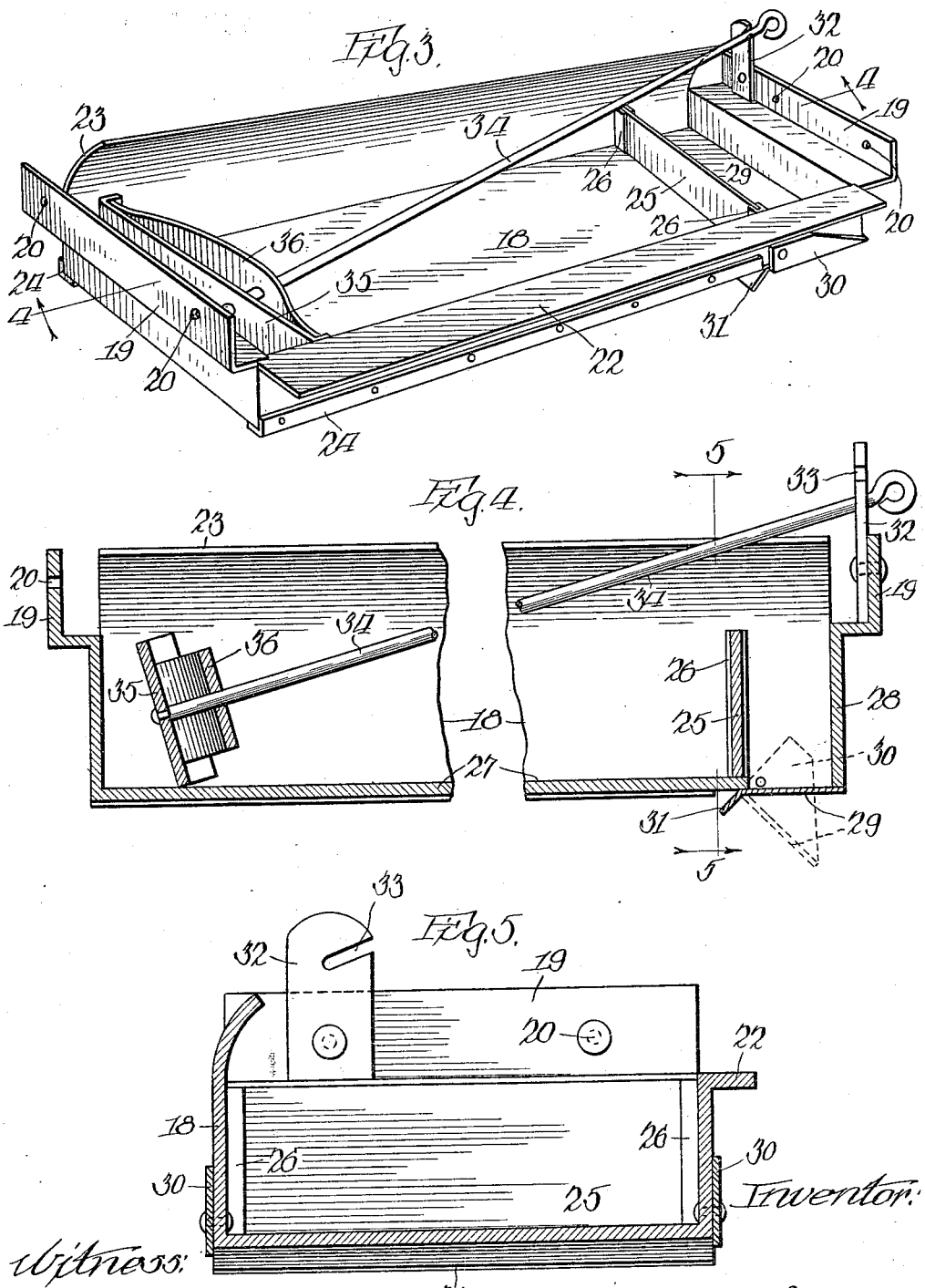

UNITED STATES PATENT OFFICE.

WILLIAM S. STEELE, OF STRONGFIELD, SASKATCHEWAN, CANADA.

GRAIN-SAVING ATTACHMENT FOR BINDERS.

1,272,140.  Specification of Letters Patent.  Patented July 9, 1918.

Application filed November 8, 1917. Serial No. 200,859.

*To all whom it may concern:*

Be it known that I, WILLIAM S. STEELE, a citizen of the United States, and a resident of Strongfield, in the Province of Saskatchewan, Canada, have invented certain new and useful Improvements in Grain-Saving Attachments for Binders, of which the following is a specification.

This invention relates to improvements in self binding grain reapers, commonly and hereinafter called binders, and has particular relation to means or an attachment to be applied to the binder, at and below the space between the horizontally traveling and grain receiving canvas or conveyer on the one side, and the elevating canvases or conveyers on the other side, for catching, retaining and emptying all grain, heads of grain, and weed seeds falling on the grain receiving canvas or conveyer, and all grain or weed seeds rubbed out between the elevating canvases or conveyers, and falling down through the opening between said horizontal and elevating canvases or conveyers, and it consists in certain peculiarities of the construction, novel arrangement and operation of the various parts thereof as will be hereinafter more fully set forth and specifically claimed.

As is well known to those conversant with the operation of self binding grain reapers and the harvesting of grain, the first and most serious loss therein, occurs when the reel hits the heads of the ripened grain, thus shelling the wheat or grain onto the horizontal or platform canvas or conveyer; then, as the grain is carried by said canvas or conveyer, a considerable quantity shells out between it and the elevating canvases or conveyers and falls back between said canvases onto the ground.

To provide simple and inexpensive means for preventing the above mentioned waste of grain by catching it, as well as, to check the dissemination of the seed of weeds, and to afford means for readily emptying the grain receiving receptacle or container is the principal object of the invention.

In the accompanying drawings which serve to illustrate an embodiment of the invention, Figure 1 is a top plan view of fragments of the frames of the horizontal or grain receiving canvas or conveyer and of the elevating canvases or conveyers of a binder, showing parts of said conveyers or canvases and portions of the rollers on which they are mounted, and illustrating the grain saving receptacle or attachment mounted on said frames below the space between the horizontal canvas or conveyer and the elevating canvases or conveyers with the parts thereof in about their normal positions.

Fig. 2 is a sectional view taken on line 2—2 of Fig. 1 looking in the direction indicated by the arrows.

Fig. 3 is a detached perspective view of the grain receptacle or container showing the cleaner therefor at a slight distance from the front end of said receptacle.

Fig. 4 is a longitudinal sectional view taken on line 4—4 of Fig. 3 looking in the direction indicated by the arrows, shortened for the convenience of illustration, and illustrating by dotted lines the position the grain emptying chute for the receptacle will occupy when grain is being removed from said receptacle by the cleaner therefor, and Fig. 5 is a cross-sectional view taken on line 5—5 of Fig. 4 looking in the direction indicated by the arrows.

Like numerals of reference refer to corresponding parts throughout the different views of the drawings.

The reference numeral 7 designates a portion of the endless grain receiving or horizontally operating canvas or conveyer which may be provided with a number of slats or cleats 8 in the ordinary manner. This canvas or conveyer 7 is extended over rollers 9, one only of which is shown, which rollers are transversely journaled on the rear part 10 and front part 11 of a suitable frame. The elevating canvases or conveyers, a part of each of which is shown in Fig. 2 of the drawings, are designated by the numerals 12 and 13 and said members may be provided with cleats or slats 14 extended cross-wise thereof as is clearly shown in Figs. 1 and 2. The endless canvas or conveyer 12 is extended over rollers 15, one only of which is shown, which rollers are transversely journaled on the rear part 10ª and front part 11ª of a suitable frame extended in alinement with the frame members of the horizontally operating canvas or conveyer. The elevating canvas or conveyer 13 is extended over rollers 16, one only of which is shown, which rollers are transversely journaled on the rear part 10ª and front part 11ª of the frame on which the rollers 15 are journaled, but below the same. By reference to Figs.

1 and 2 of the drawings, it will be seen that the roller 16 of the lower elevating canvas or conveyer is located near the roller 9 of the horizontally operating conveyer 7 and in parallelism therewith but at a slight distance therefrom. Transversely mounted on the frame members 10 and 11 beneath the roller 9 is a platform 17 which assists in holding the members 10 and 11 together. The grain receiving receptacle or container is designated as a whole by the reference numeral 18, and is rectangular in shape, and may be made of any suitable size and material but preferably of sheet metal. At each of its ends the receptacle 18 is provided with an angular portion 19, each of which is extended outwardly and then upwardly and is provided with a number of openings 20 for the reception of bolts or rivets 21 used to secure said portions to the rear and front members of the frame on which the rollers of the conveyers are journaled, for it will be seen and understood by reference to Figs. 1 and 2 of the drawings that the receptacle 18 is located directly beneath the space between the rollers 9 and 16 of the conveyers 7 and 13, and that said receptacle extends the entire width of said conveyers. As is clearly shown in Figs. 2, 3 and 5 of the drawings the receptacle 18 is provided at the upper edge of one of its sides with a laterally projected flange 22 which rests on the platform 17 which assist in supporting the receptacle. The opposite side of the receptacle is provided with an upward extension 23 which is slightly inwardly curved as shown in Figs. 2 and 5 of the drawings, to cause the grain falling from the conveyers into the receptacle being thrown back into the receptacle should it bounce or be carried against said side. Each of the lower longitudinal edges of the receptacle is by preference reinforced by angle iron strips 24 to give additional rigidity and strength to the receptacle. Extended crosswise of the receptacle at a suitable point near its rear end is a slidable door or member 25 which fits in suitable guide ways 26 vertically located on the inner surfaces of the sides of the receptacle. The floor 27 of the receptacle extends from the front end thereof to a point directly under the slidable member 25 so as to support said member but the floor terminates at this point as will be clearly seen by reference to Fig. 4 of the drawings, thus leaving an open space in the bottom of the receptacle between the slidable member 25 and the rear end 28 of the receptacle, for the discharge of grain therefrom as will be presently explained. In order to close the said opening in the floor of the receptacle between the member 25 and the rear end 28 thereof, a chute consisting of a flat piece 29 of sufficient size to close said opening is employed. This flat member 29 has at each of its ends an upwardly extended portion 30 which are pivotally secured to the sides of the receptacle, thus providing hinged movement therefor. Near its pivoted or hinged portion the member 29 is provided with a flange 31 which is located at an angle to the member 29 so that when the chute formed by the member 29 and extensions 30 is depressed to the position shown by dotted lines in Fig. 4, the flange 31 will rest against the floor 27 and prevent further downward movement of the chute. When it is desired to close the opening between the member 25 and rear end of the receptacle, the member 29 may be raised to a horizontal position in which position it will be maintained by reason of the clamping action of the members 30 against the sides of the receptacle. At its rear end the receptacle is provided with an upright standard 32 having a slot 33 therein for the reception of the handle 34 of the cleaner for the receptacle. This cleaner in construction is similar to a stove flue cleaner and consists of a scraper 35 on one end of the handle 34 which handle is of sufficient length to extend from one end of the receptacle to the other end thereof. As shown in Fig. 3 of the drawings, the scraper 35 is of sufficient length to extend from one side of the receptacle to the other and may be braced to the handle by means of a curved member 36 through a suitable opening in which the handle is extended.

From the foregoing and by reference to the drawings it will be readily understood and clearly seen that when the receptacle is mounted below the open space between the grain receiving canvas or conveyer and the elevating canvases or conveyers any loose grain or grain heads falling from the said conveyers will be caught by the receptacle and prevented from falling to the ground. When it is desired to empty the receptacle, it is only necessary to raise the slidable member or door 25, when it is obvious that the grain in the conveyer can be raked rearwardly and onto the floor 29 of the chute. By placing a suitable receptacle below the chute and depressing the latter it is manifest that the grain will be guided into such receptacle by means of which it may be removed.

Having thus fully described my invention, what I claim as new and desire to secure by Letters Patent is—

1. A grain saving attachment for binders consisting of a receptacle horizontally mounted beneath the space between the grain receiving canvas or conveyer and the grain elevating canvases or conveyers of the binder, and having an opening in its floor at one end thereof, a movable member or door located transversely between the sides of the receptacle at the inner edge of said opening, and a chute pivotally secured to the sides of the receptacle to close said opening.

2. A grain saving attachment for binders consisting of a receptacle horizontally mounted beneath the space between the grain receiving canvas or conveyer and the grain elevating canvases or conveyers of the binder, and having an opening in its floor at one end thereof, a movable member or door located transversely between the sides of the receptacle at the inner edge of said opening, and a chute to close said opening, said chute having at its sides upward extensions pivotally secured to the sides of the receptacle and clamping the same.

3. A grain saving attachment for binders, consisting of an elongated shallow receptacle horizontally mounted beneath the space between the grain receiving canvas or conveyer and the elevating canvases or conveyers of the binder, and longitudinally with respect to said space, the said receptacle having an opening in its floor at one end thereof, a vertically slidable member located transversely between the sides of the receptacle at the inner edge of said opening, and a chute to close said opening, said chute having at its sides upward and clamping extensions pivotally secured to the sides of the receptacle near the inner edge of said opening therein, the said chute also having near its pivots a flange extended at an angle from its floor to strike the floor of the receptacle and restrict the downward movement of the chute.

WILLIAM S. STEELE.

Witnesses:
J. E. O'Phelan,
W. B. Tate.

Copies of this patent may be obtained for five cents each, by addressing the "Commissioner of Patents, Washington, D. C."